E. KEITH.
Improvement in Railroad Conductors' Check-Boxes.
No. 127,487. Patented June 4, 1872.
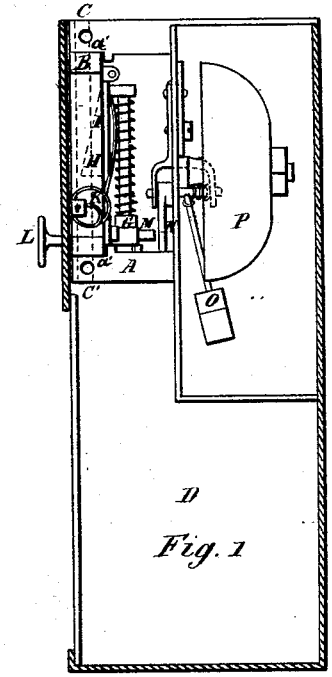
Fig. 1
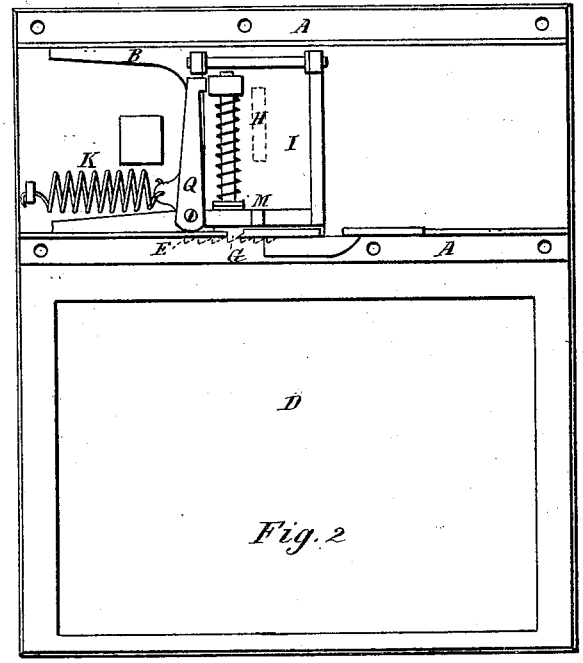
Fig. 2
Fig. 3
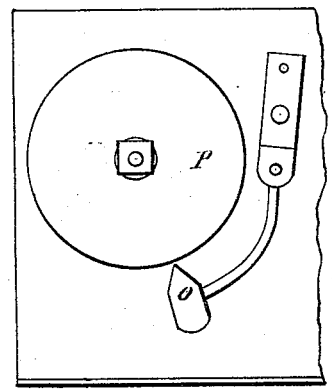
Fig. 4
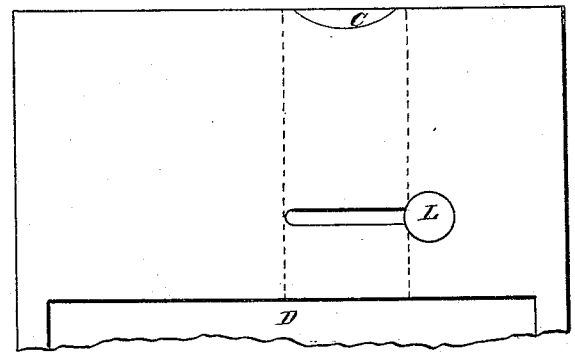
Fig. 5
Fig. 7
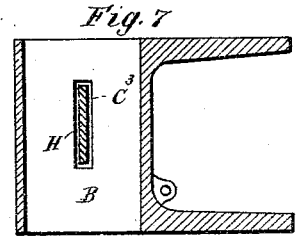
Fig. 6
Witnesses
H. W. Dopp
Michael J. Stark
Inventor
Edmund Keith 127,487

UNITED STATES PATENT OFFICE.

EDMUND KEITH, OF BUFFALO, N. Y., ASSIGNOR TO JOHN W. GORDON.

IMPROVEMENT IN RAILROAD CONDUCTORS' CHECK-BOXES.

Specification forming part of Letters Patent No. 127,487, dated June 4, 1872.

Specification describing certain Improvements in Ticket or Check Depository, invented by EDMUND KEITH, of Buffalo, in the county of Erie and State of New York.

My invention relates to the construction of a ticket or check depository to be used by street-railroad and omnibus conductors or drivers, and provided with an alarm, so arranged that the same will report whenever a ticket or check is delivered to the safe-keeping compartment of the apparatus; the object of this invention being to enable the passenger paying his fare to the conductor to see a ticket or check representing said fare being properly credited to conductor's employer, the conductor being required to make a deposit of a check or ticket in the presence of the passenger for every fare he receives, the alarm calling the attention of the passenger to the fact of a deposit having been made, still not giving any one access to the ticket or check deposited, except by first breaking a seal, by means of which the safe-keeping compartment may be locked; and my invention consists in the combination of the ticket or check receiving sliding head with a feeler and a guiding-bar, by means of which the alarm is operated, and the ticket or check released from the incline grabbing it, in order that it may drop into the safe-keeping compartment whenever the receiving-head is slided or pushed forward.

Figure 1 is a side view of a machine embodying my invention. Fig. 2 is an interior view at right angles of Fig. 1, the alarm being detached. Fig. 3 represents the alarm. Fig. 4 is a front view of my ticket or check depository. Fig. 5 is a sectional plan illustrating the construction of the feeler and guiding-bar, by means of which the alarm is operated and the ticket or check deposited. Fig. 6 is a top view of the receiving sliding head. Fig. 7 is a vertical section of the same.

$a$ is the main frame; it is provided with two grooves, $a'$, into which fits and slides the receiving-head B. It is also provided with a slot-hole, C, on its top side, through which the ticket or check is to be introduced, and a like opening in its lower portion for the passage of the ticket or check to the safe-keeping compartment D. It is further provided with a row of ratchet-teeth, E, and a guiding-bar, F, on its lower interior face, which engages with the feeler G whenever a ticket or check is inserted into the slot-hole C and the receiving-head B pushed ahead. B is the receiving sliding head. It is fitted and sliding in A, as before stated. Said head is provided with a slot-hole, $C^2$, running through it perpendicularly. It is for the reception of the ticket or check. B is also provided with a slot-hole, $C^3$, running at right angles into $C^2$. An incline, H, secured to a hinged plate, I, reaches through slot-hole $C^3$ sufficiently to cause hinged plate I to be pressed back whenever a ticket or check is introduced into $C^2$. A coiled spring, K, is hitched with one end to sliding head B, and with the other end to the frame A, in order to pull back the head B whenever it has been pushed ahead. A knob, L, secured to B, reaches through a slot-hole in the front side of main frame A, as shown in Figs. 1 and 5, by means of which the receiving sliding head B is moved ahead whenever a deposit of a ticket or check is made. I is a plate hinged to receiving-head B. It is provided with an incline, H, on side next to the front, and on its back side with a feeler, G, and a thumb, M. Said feeler is surrounded by a coiled spring, causing the same to engage with the ratchet-teeth E, for the purpose of preventing head B from being pulled back before it has been moved ahead sufficiently to drop a ticket or check at $C^1$. The thumb M is of such length as to pass the alarm-lever N without interfering when B and I are slided ahead; but if a ticket or check is introduced into B the hinged plate I is pushed back, and thereby causing thumb M to engage with alarm-lever N, causing the hammer O to strike an alarm-bell, P.

Be it observed that the feeler G and the guiding-bar F are of such construction that whenever I is pushed back to the least extent G will pass over to the right-hand side of guiding-bar F, as shown in Fig. 5, causing the alarm to operate and the ticket to drop through slot-hole $C^1$. The feeler, before its return passage, passes back again upon the left-hand side of guiding-bar F by the action of blade-spring Q acting upon I, in order to pass the alarm. (See Fig. 5.) Be it further observed the the alarm will not operate, therefore, unless a ticket or check is placed into B. The safe-keeping compartment is provided with a glass door or cover, or like, and locked by means of a seal or otherwise.

To operate this apparatus, introduce a ticket or check into the opening C, and then push the knob L from right to left until it comes to a stop; then let go, and the coiled spring will set all parts back into their proper position ready for reaction.

Having fully described my invention, I desire to secure by Letters Patent—

The combination of a receiving-head, B, incline H, hinged plate I, feeler G, guiding-bar F, thumb M, and the alarm-lever N or equivalent, to operate substantially as specified.

EDMUND KEITH.

Witnesses:
  H. WM. DOPP,
  MICHAEL J. STARK.